Patented Oct. 10, 1950

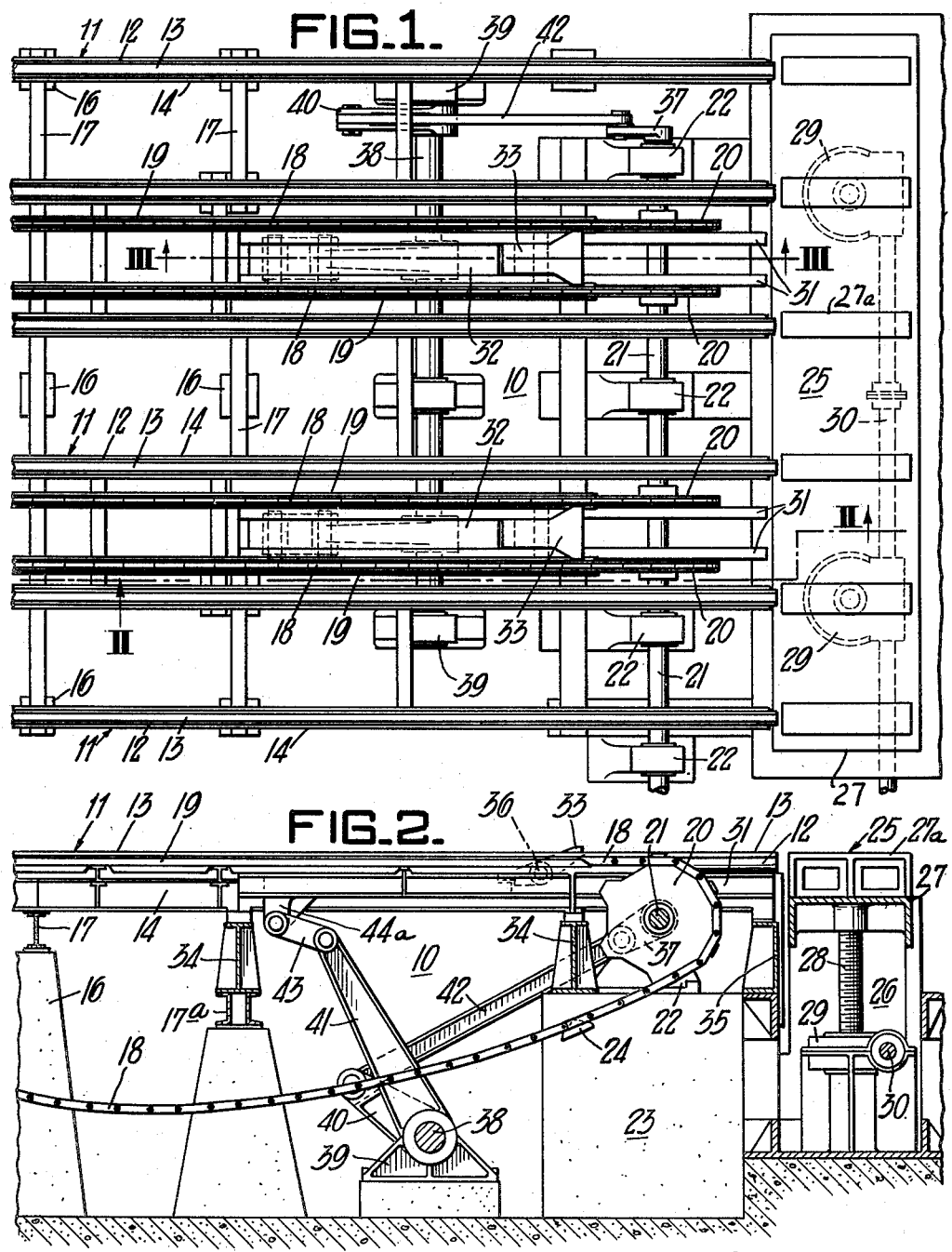

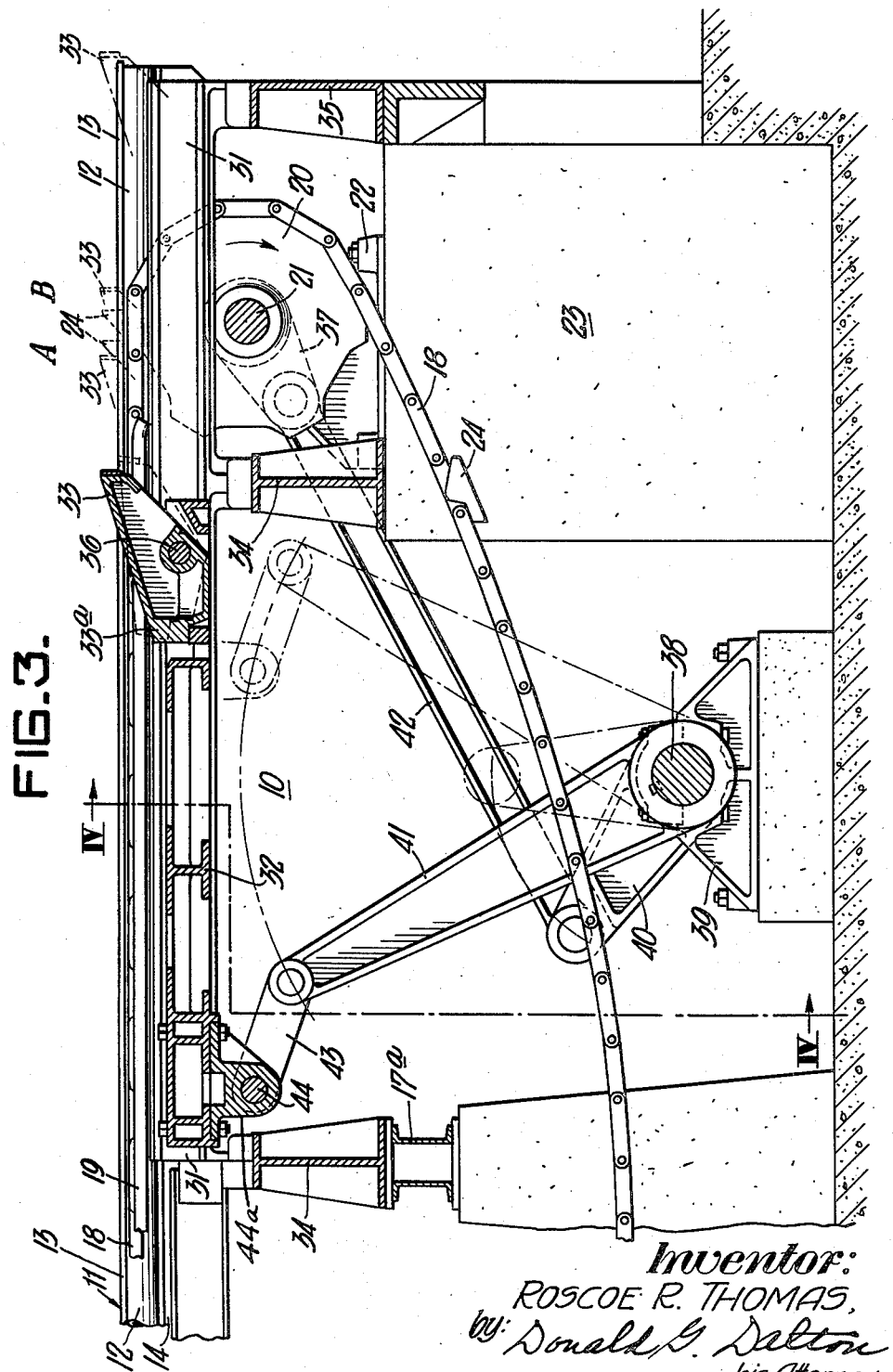

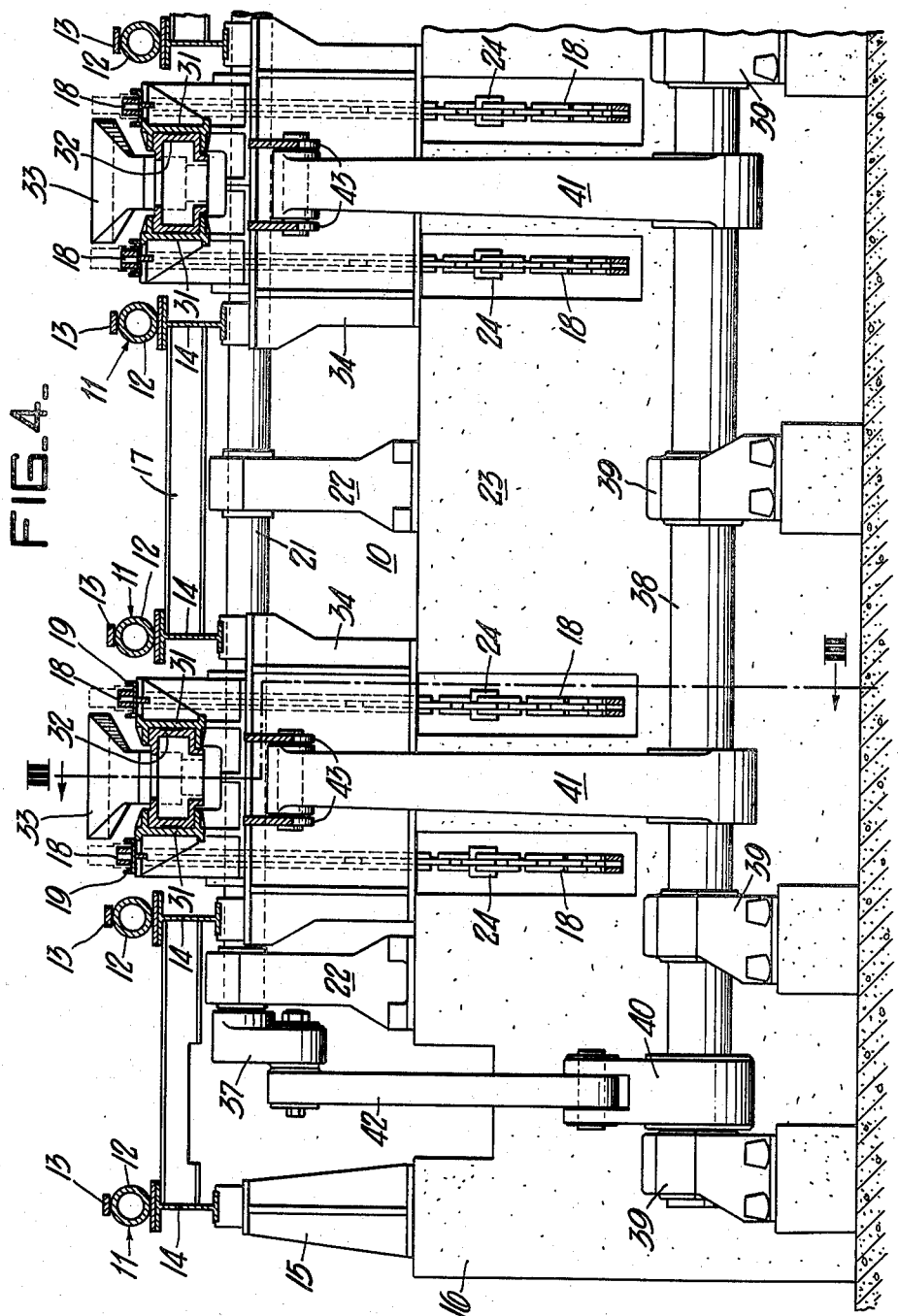

2,525,189

UNITED STATES PATENT OFFICE 2,525,189

RECIPROCATING PUSHER FOR DISCHARGE ENDS OF CHAIN-AND-SKID CONVEYERS

Roscoe R. Thomas, Fairfield, Ala., assignor to Tennessee Coal, Iron and Railroad Company, a corporation of Alabama Application March 15, 1949, Serial No. 81,488

5 Claims. (Cl. 198—24)

This invention relates to article-handling apparatus and, in particular, to a device for transferring articles from the delivery end of a chain-and-skid conveyor onto a receiving device, independently of the dogs secured to the chains for pushing the articles along the skids.

Chain-and-skid conveyors are extensively used for handling articles of various kinds and particularly for large, heavy articles. In cases where such conveyors deliver articles onto a receiving device at substantially the level of the skids, the dogs secured to the chains for pushing the articles along the skids tend to score the sides of the articles as the dogs travel downwardly around the chain sprockets at the discharge end of the conveyor. This is seriously objectionable in certain installations such as the conveyor alongside a continuous slab-heating furnace of a strip mill, for returning heated slabs from the discharge end of the furnace to the slab-storage space when operation of the mill is interrupted for any reason. In such an installation, the pusher dogs seriously mar the edges of the slab because of the high temperature which it retains even after traveling the length of the furnace in the open air. In addition, the dogs are subject to excessive wear because of the change in the angle of engagement with the slab edge as the dogs start downwardly around the sprockets.

I have invented a novel supplemental pusher or transfer device adapted to cooperate with a chain-and-skid conveyor and effective to accelerate an article on the conveyor ahead of the chain dogs as they approach the delivery end and push it off the skids and onto a receiving support independently of the dogs. The transfer pusher reciprocates parallel to the skids and thus avoids the injury to the slabs which would otherwise be caused by the tilting of the dogs in traversing a circular path around the sprockets. The pusher of my invention comprises a slide traveling in ways between a pair of conveyor skids and parallel thereto. A dog pivoted on the slide is adapted to be tilted down to an out-of-the-way position on striking a slab during retraction of the slide and to rise to a slab-engaging position after passing beyond the slab so as to push it ahead of the chain dogs on forward movement of the slide. The slide may be operated by any convenient means but must be actuated in timed relation to the travel of the chain. For this reason, I prefer to actuate the slide from the conveyor shaft through suitable mechanism such as a crank, a connecting rod and a rock shaft. In any case, the slide is advanced at the proper instant and at a rate of acceleration such that the pusher dog will overtake the chain dogs and pass beyond them before the latter start to turn downwardly. In the embodiment illustrated there are two sets of chains and a transfer device for each to facilitate handling articles of considerable length, e. g., slabs up to 30 feet long.

A clear understanding of the invention may be obtained from the following detailed description and explanation of a present preferred embodiment thereof illustrated in the accompanying drawings. In the drawings, Figure 1 is a partial plan view showing the delivery end of a chain-and-skid conveyor and a piler adapted to receive slabs therefrom;

Figure 2 is a partial section taken along the plane of line II—II of Figure 1 with parts in elevation;

Figure 3 is a longitudinal section taken along the plane of line III—III of Figure 1; and Figure 4 is a partial transverse section taken along the plane of line IV—IV of Figure 3; line III—III of Figure 4 further illustrates the plane on which the section shown in Figure 3 is taken.

Referring now in detail to the drawings, a chain-and-skid conveyor indicated generally at 10 comprises a plurality of spaced parallel skids 11 of suitable length. In the construction shown, the skids are composed of pipe lengths 12 (see Figure 4) surmounted by rails 13. The skids are supported on beams 14 resting on pedestals 15 extending upwardly from piers 16. Transverse beams 17 extend between the beams 14 constituting therewith a rigid grating or supporting frame.

The conveyor illustrated includes two sets of three skids each. A pair of chains 18 travel in guide tracks 19 of channel section parallel to the skids and disposed between the inner two skids of each set. The tracks 19 are mounted on suitable supports carried by the beams 14 and are disposed at a level slightly below that of the rails 13, as shown in Figure 4. The chains traverse sprockets 20 mounted on shafts 21 journaled adjacent the ends of the conveyor. The shaft 21 shown is driven by any convenient means such as a motor and reducing gear (not shown). The bearings supporting the shaft illustrated are shown at 22 and are disposed on piers 23. Each of the chains 18 has a pair of dogs 24 pivoted thereto which, when traversing the tracks 19, project upwardly above the level of the rails 13, as shown in dotted lines in Figure 4, so as to engage an article resting thereon such as a slab, and push it therealong. By this means, the article is caused to slide along the skids from one end of the conveyor to the other for eventual discharge onto a piler, indicated generally at 25.

The piler comprises a base frame 26 and a table 27 adjustable vertically thereof. The table has blocks 27ª spaced therealong and is carried on screws 28 threaded through tapped bores in worm wheels mounted in housings 29 within the base frame. A worm shaft 30 journaled in the base frame 26 and driven by a motor (not shown) has worms thereon meshing with the worm wheels in housings 29. The shaft 30 is driven so as to lower the table 27 step-by-step after the deposit thereon of successive slabs, thereby maintaining the upper surface of the last slab deposited substantially flush with the top of the rails 13.

Because of the radius of the sprockets 20 and the need for mechanical clearance between them and the piler, the dogs 24, on reaching the delivery end of the conveyor, start downwardly around the sprockets before the slabs have been finally positioned on the piler and, but for the improvement now to be described, would thus tend to score the edge of the slab engaged by the dogs and to cause excessive wear of the latter. To avoid such undesirable effects, I provide a pusher for engaging the slabs just before it reaches the delivery end of the conveyor, accelerating it ahead of the dogs 24 and positively placing it in properly centered position on the table 27 of the piler. The pusher includes a pair of spaced parallel ways 31 (see Figure 4) disposed between each pair of chain tracks 19, a slide 32 reciprocable along each set of ways and a dog 33 pivoted at the forward end of each slide.

The ways 31 are supported on beams 34 resting on crossbeams 17ª and a pedestal 35. The slides 32 are simply flat, elongated box-like castings having their surfaces adjacent the longitudinal corners finished to run on bearing strips set in the cooperating faces of the ways 31. The dog 33 on each slide is a hollow casting of roughly triangular shape pivoted on a pin 36 extending transversely through the slide. Each dog has a counterweight 33ª at its rear end adapted normally to maintain it in the position shown in solid lines in Figure 3 in which it is adapted to engage a slab resting on the skids. The dogs, however, will tilt downwardly to the dotted-line position on engagement by a slab. As soon as the dogs have passed beyond the rear edge of the slab, they return to normal or pushing position.

In order to effect transfer of a slab from the skids to the piler independently of the chain dogs 24, I provide means for reciprocating the slides in timed relation with the arrival of the dogs 24 at the sprockets 20. This means comprises a crank 37 on the sprocket shaft 21 and a rock shaft 38 journaled in bearings 39 below the conveyor. The shaft 38 has a crank arm 40 keyed thereto and a pair of crank arms 41, one for each slide. A link 42 connects the crank 37 to the crank arm 40, and links 43 connect each of the crank arms 41 to a pin 44 extending through a dead-eye bearing 44ª bolted to the bottom of one of the slides 32 adjacent the rear end thereof. As the shaft 21 is driven clockwise to advance the upper run of the chains 18 from left to right, therefore, rock shaft 38 is oscillated by the crank 37 through the link 42 and crank arm 40. This causes oscillation of crank arm 41 and reciprocation of slides 32.

Slides 32 reciprocate idly until an article such as a slab is pushed forward along the skids 11 by dogs 24 on the chains 18. As the slab approaches a position over the shaft 21, the dogs 33 are tilted down so as to pass under the slab on retraction of the slide. After passing the rear edge of the slab, the dogs are restored to the illustrated position for engagement with the slab on the next forward stroke of the slide. The parts actuating the slide are dimensioned so that the dogs 33 will overtake the dogs 24 before the latter start downwardly around the sprocket 20. The slide has a simple harmonic motion and its velocity, therefore, is a maximum at the middle of its stroke. It is thus able to overtake the dogs 24 which travel at constant speed.

Figure 3 shows in dotted lines the relative positions of the dogs 33 and dogs 24 at two points on opposite sides of the middle point of the travel of the slide 32. It will be observed that, at point A, the dogs 24 are leading and the dogs 33 are trailing, while at position B, which the dogs occupy a short time later, the dogs 33 have moved ahead of the dogs 24. The latter are thus relieved of the load involved in pushing the slab and the latter is pushed over the ends of the skids 11 by dogs 33 and onto the piler table 27 at a diminishing speed as the slides approach the forward limit of their movement. It will be apparent from the foregoing that the slab is pushed ahead of the dogs 24 before they can exert any scoring action on the rear edge thereof as they turn down around the sprocket. This avoids damage to the edge of the slab as well as excessive wear on the dogs themselves.

It will be evident that the invention provides simple yet effective means for delivering articles from a chain-and-skid conveyor onto a receiving surface in orderly fashion and without injury thereto. In short, the reciprocating slides serve to bridge the space between the final effective position of the chain dogs and the extreme end of the conveyor skids, thus insuring continued movement of the articles after the chain dogs have reached a position at which they are unable properly to advance the articles further onto the receiving surface. The slide being actuated by the drive shaft of the conveyor always operates in properly timed relation to the arrival of the slab at the delivery end of the skids. This automatic operation renders constant supervision and attendance unnecessary. The only manually-controlled function involved is the operation of the piler to lower the table after a slab has been deposited thereon.

Although I have illustrated and described only a preferred embodiment of the invention, it will be recognized that changes in the details and arrangement thereof may be made without departing from the spirit of the invention or the scope of the appended claims.

I claim:

1. Transfer mechanism for the delivery end of a conveyor including skids and a chain fitted with dogs and traversing sprockets mounted on shafts journaled adjacent the ends of the conveyor, said mechanism comprising ways extending longitudinally of the conveyor and rearwardly from the delivery end, a slide reciprocable along said ways, a dog pivoted on said slide and means actuated by the shaft of the sprocket at the delivery end of the conveyor for operating said slide.

2. The apparatus defined by claim 1 characterized by said means including a crank on the shaft adjacent the delivery end of the conveyor.

3. The apparatus defined by claim 2 characterized by said means also including a rock shaft, means whereby the crank operates the rock shaft and means whereby the rock shaft operates the slide.

4. The apparatus defined by claim 2 characterized by said means also including a rock shaft having two arms, a link connecting said crank to one of said arms and a link connecting the other arm to said slide.

5. The apparatus defined by claim 1 characterized by means normally urging said dog toward a position in which it will engage an article on said skids.

ROSCOE R. THOMAS.

REFERENCES CITED

The following references are of record in the file of this patent:

UNITED STATES PATENTS

| Number | Name | Date |
|---|---|---|
| 1,591,422 | Haas | July 6, 1926 |
| 1,631,125 | Happel | June 7, 1927 |
| 1,680,996 | Kitchel et al. | Aug. 14, 1928 |
| 2,363,920 | Young et al. | Nov. 28, 1944 |